United States Patent
Naito et al.

(10) Patent No.: US 7,837,185 B2
(45) Date of Patent: Nov. 23, 2010

(54) JIG FOR PRODUCING CAPACITORS, APPARATUS FOR PRODUCING CAPACITORS AND METHOD FOR PRODUCING CAPACITORS

(75) Inventors: Kazumi Naito, Chiba (JP); Shoji Yabe, Chiba (JP)

(73) Assignee: Showa Denko K.K., Tokyo (JP)

( * ) Notice: Subject to any disclaimer, the term of this patent is extended or adjusted under 35 U.S.C. 154(b) by 676 days.

(21) Appl. No.: 11/667,045

(22) PCT Filed: Nov. 2, 2005

(86) PCT No.: PCT/JP2005/020656
§ 371 (c)(1),
(2), (4) Date: May 4, 2007

(87) PCT Pub. No.: WO2006/049317
PCT Pub. Date: May 11, 2006

(65) Prior Publication Data
US 2008/0137261 A1    Jun. 12, 2008

(30) Foreign Application Priority Data
Nov. 4, 2004    (JP) .............................. 2004-320256

(51) Int. Cl.
*B23Q 3/00*    (2006.01)
(52) U.S. Cl. .................... 269/289 R; 29/281.1
(58) Field of Classification Search ............. 269/289 R, 269/302.1, 903; 29/281.1, 25.03
See application file for complete search history.

(56) References Cited
U.S. PATENT DOCUMENTS 4,125,046 A * 11/1978 Kroh et al. .................. 83/437.2
6,206,356 B1 * 3/2001 Beloff ..................... 269/289 R
7,469,886 B2 * 12/2008 Shen et al. .................... 269/21
2008/0137261 A1 * 6/2008 Naito et al. .............. 361/301.1

FOREIGN PATENT DOCUMENTS

| JP | 57-37820 | 3/1982 |
| JP | 57-37820 A | 3/1982 |
| JP | 62-4127 | 1/1987 |
| JP | 62-4127 U | 1/1987 |
| JP | 64-32619 A | 2/1989 |
| JP | 2-224314 A | 9/1990 |
| JP | 2-298010 A | 12/1990 |
| JP | 4-103640 | 9/1992 |
| JP | 4-103640 U | 9/1992 |
| JP | 2002-313684 | 10/2002 |
| JP | 2002-313684 A | 10/2002 |

* cited by examiner

*Primary Examiner*—Lee D Wilson
(74) *Attorney, Agent, or Firm*—Sughrue Mion, PLLC

(57) ABSTRACT

The invention provides (1) a jig for producing capacitors, which stabilizes multiple long plates in order to simultaneously form dielectric layers on a plurality of conductors connected to the long plates and subsequently simultaneously form semiconductor layers thereon, wherein two edge-receiving portions to receive and fix the edges of each plate are electrically insulated from each other, (2) an apparatus comprising the jig for producing capacitors, having feeding terminals for forming dielectric layer and for forming semiconductor layer and long plates comprising a mechanism connecting multiple conductors, and a method for producing capacitors. According to the invention, capacitors each having semiconductor layer as one electrode, narrow in variation of capacitance, and excellent in the ESR value, can be produced at a time.

8 Claims, 3 Drawing Sheets

(A)

(B)

JIG FOR PRODUCING CAPACITORS, APPARATUS FOR PRODUCING CAPACITORS AND METHOD FOR PRODUCING CAPACITORS

TECHNICAL FIELD

The present invention relates to a jig for producing capacitors, which fixes multiple long plates in order to form dielectric layers on multiple conductors connected to the long plates at a time and subsequently form semiconductor layers thereon at a time, an apparatus for producing capacitors using the jig and a method for producing capacitors.

BACKGROUND ART

As capacitors having high capacitance and low ESR (equivalent series resistance) used in various electronic devices, aluminum solid electrolytic capacitor and tantalum solid electrolytic capacitor are used.

A solid electrolytic capacitor consists of an aluminum foil having fine pores on its surface layer or a sintered body of tantalum powder having fine pores inside as one electrode (conductor), a dielectric layer formed on the surface layer of the electrode having pores, the other electrode (usually, a semiconductor layer) formed on the dielectric layer and an electrode layer laminated on said other electrode.

There is a conventional method for mass-production of such a capacitor on industrial scale, as follows. For the purpose of simultaneously forming on multiple conductors dielectric layers and then semiconductor layers respectively, a metal frame having multiple long metal plates placed at regular intervals thereon on each of which plates the multiple conductors oriented in the same direction are placed and connected at regular intervals is placed on a container containing a separately-prepared solution for chemical formation. After the conductors are immersed in the solution, current is applied at constant voltage by using the metal frame as anode and a metal plate immersed in the solution for chemical formation as cathode to thereby form dielectric layer. Subsequently, by placing the metal frame alternately on a container containing a separately prepared raw material solution for forming a semiconductor layer and on a container containing an oxidizing agent solution for oxidizing the raw material to form a semiconductor, the conductors are immersed in each of the solutions to thereby chemically laminate a semiconductor layer on the dielectric layer on each of the conductors. Also, Japanese Patent Application Laid-Open Nos. S64-32619 and H2-224314 disclose a method wherein after forming a dielectric layer on one conductor, the conductor is immersed in a container containing a solution for forming a semiconductor layer and current is applied by using as anode an outside electrode placed in the vicinity of the conductor and as cathode a metal plate in the solution for forming a semiconductor layer, to thereby electrochemically laminate a semiconductor layer on the dielectric layer.

DISCLOSURE OF THE INVENTION

Generally, since a chemically formed semiconductor layer is not uniform in the thickness or not uniform in its composition or continuity constituting the semiconductor layer itself (for example, in a case where the semiconductor layer is an electroconductive polymer, the polymer has branches), as compared with an electrochemically obtained semiconductor layer, the resistance of the semiconductor layer is high and as a result, the ESR value of a capacitor produced by using such a semiconductor is large, which is disadvantageous. Moreover, a method of electrochemically forming a semiconductor layer is problem-free in a case of using several or less conductors, but in a case where production is carried out on an industrial production scale, for example, in a case where a semiconductor layer is formed on each of multiple conductors placed on a long plate, it is difficult to provide an outside electrode in the vicinity of each if the conductors and dispersion in placing the outside electrodes causes unevenness in values of currents passed to the conductors, which results in irregularity in shapes of the formed semiconductor layers of the capacitors, making it difficult to achieve production of capacitors having stable capacitance.

Accordingly, the object of the present invention is to provide a means for producing capacitor elements (a jig for producing capacitors and an apparatus for producing capacitors), which enables stable formation of semiconductor layers and production of capacitors having a narrow variation in capacitance in a case where dielectric layers and semiconductor layers are formed sequentially on multiple conductors by applying current on an industrial production scale.

As a result of extensive studies made with a view to solving the above problems, the present inventors have found out that without using an outside electrode, current can be applied by using a conductor itself as anode and that by employing a jig for long plates which is suitable for industrial-scale production and an apparatus for producing capacitors using the jig, which can overcome conventional inconvenience of detaching conductors from each plate step after step due to differences in conditions for applying current between dielectric layer formation process and semiconductor layer formation process, capacitors can be produced with a narrow variation in capacitance, thus completed the present invention.

That is, the present invention provides the following jig for producing capacitors, an apparatus for producing capacitors, a method for producing capacitors, and a capacitor produced by using the apparatus and the method.

1. A jig for producing capacitors, which is a jig fixing long plates used for simultaneously forming dielectric layers on multiple conductors for solid electrolytic capacitors and simultaneously forming semiconductor layers on the dielectric layers thereon, comprising two mutually electrically insulated edge-receiving portions to fix both edges of each of the long plates.

2. The jig for producing capacitors described in 1, wherein the edge-receiving portion has an insulating body required for mutual electrical insulation.

3. The jig for producing capacitors described in 1, wherein the edge-receiving portion has a wiring to electrically connect to each of the conductors through an electric circuit on the long plate.

4. The jig for producing capacitors described in 1, wherein the edge-receiving portion has an incision to receive the long plate.

5. The jig for producing capacitors described in 4, wherein each of the two edge-receiving portions has multiple incisions to receive multiple long plates.

6. The jig for producing capacitors described in 4 or 5, wherein each of the incisions of the two edge-receiving portions has a fixture for fixing the received long plate.

7. The jig for producing capacitors described in 6, wherein the fixture is a spring which serves also as part of electric wiring to connect to each of the conductors through an electric circuit on the long plate.

8. An apparatus for producing solid electrolytic capacitors, comprising the jig for producing capacitors described in any one of 1 to 7 and long plates for simultaneously forming dielectric layers on multiple conductors for solid electrolytic capacitors and simultaneously forming semiconductor layers on thus formed dielectric layers by using the jig, wherein each of the long plates has a feeding terminal for forming the dielectric layer and a feeding terminal for forming the semiconductor layer and is equipped with connection mechanism for connecting multiple conductors.

9. The apparatus for producing capacitors described in 8, having a structure where the feeding terminal of the long plate is connected to one edge-receiving portion and the other feeding terminal of the long plate is connected to the other edge-receiving portion.

10. A method for producing capacitors, comprising using the apparatus for producing solid electrolytic capacitors described in 8 or 9, wherein by applying current from one edge-receiving portion in the jig for producing capacitors, dielectric layers are formed on conductors and by applying current from the other edge-receiving portion, semiconductor layers are formed on the dielectric layers.

11. The method for producing solid electrolytic capacitors described in 10, wherein the conductor is a metal or an alloy containing as its main component at least one kind selected from the group consisting of tantalum, niobium, titanium and aluminum, niobium oxide or a mixture of at least two kinds selected from the group consisting of these metals, alloys thereof and niobium oxide.

12. The method for producing solid electrolytic capacitors described in 10, wherein the dielectric layer contains as its main component at least one selected from the group consisting of $Ta_2O_5$, $Al_2O_3$, $TiO_2$ and $Nb_2O_5$.

13. The method for producing solid electrolytic capacitors described in 10, wherein the semiconductor layer comprises an organic semiconductor layer.

14. The method for producing solid electrolytic capacitors described in 13, wherein the organic semiconductor layer consists of a dopant-containing material of polymer selected from the group consisting of polyaniline, polyoxyphenylene, polyphenylene sulfide, polythiophene, polyfuran, polypyrrole, polymethylol pyrrole, and substituted derivatives and copolymers thereof.

15. The method for producing solid electrolytic capacitors described in 14, wherein the polymer is poly(3,4-ethylene dioxythiophene).

16. The method for producing solid electrolytic capacitors described in 13, wherein electroconductivity of the semiconductor is within a range of $10^{-2}$ to $10^3$ S/cm.

17. A capacitor produced by using the apparatus for producing capacitors described in 8 or 9.

18. A group of capacitors produced by the method described in any one of 10 to 16.

MODE FOR CARRYING OUT THE INVENTION

Figure 1:
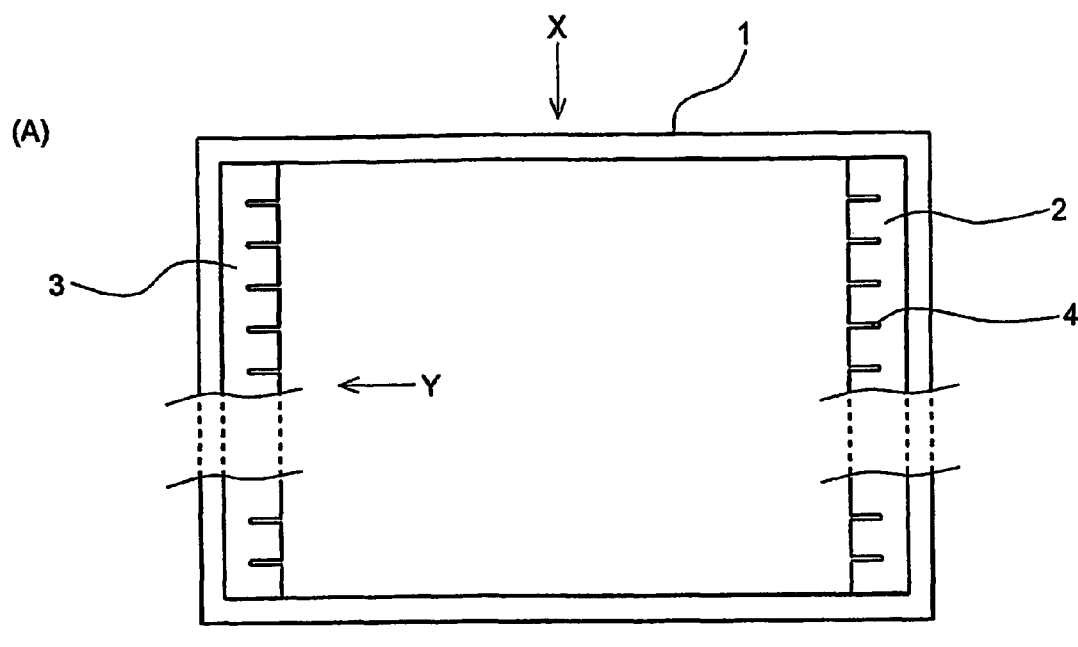
FIG. 1 (A) is a plain view showing a structure of one embodiment of the jig for producing capacitors according to the present invention, and FIGS. 1 (B) and 1 (C) are schematic views of FIG. 1 (A) as seen from X direction and Y direction, respectively.
Figure 1:
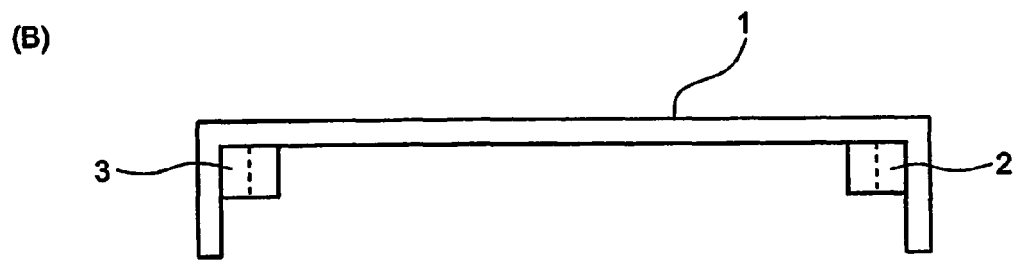
Figure 1:
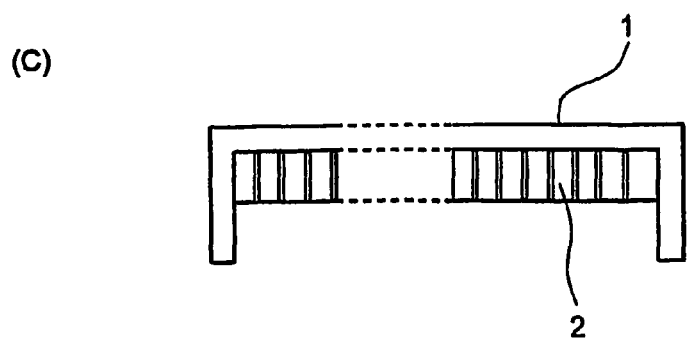

The jig and apparatus for producing capacitors according to the present invention is described in detail below.

Examples of conductors on which a dielectric layer and a semiconductor layer can be formed by using the jig and apparatus for producing capacitors of the present invention include a metal (or an alloy) containing as its main component at least one kind selected from the group consisting of tantalum, niobium, titanium and aluminum, niobium monoxide, niobium dioxide, and a mixture of at least two kinds selected from these metals and niobium oxides.

In a case where a metal is used as conductor, it may be used after part of the metal is subjected to at least one treatment selected from carbonization, phosphidization, boranation, nitridation and sulfurization.

There is no particular limitation on the shape of the conductor, and generally the conductor is used in form of foil, sheet, bar or the like. In order to obtain such a shape, the conductor itself may be pulverized and then molded or sintered after molded. Alternatively, powder of the pulverized conductor may be attached onto part of a metal foil or metal sheet and then sintered. The surface of the conductor may be subjected to etching treatment to have fine pores thereon. In a case where the conductor is pulverized and then molded or sintered after molded, fine pores can be provided inside the molded or sintered body by selecting an appropriate pressure at the time of molding.

A lead wire may be directly connected to the conductor. In a case where the conductor is pulverized and then molded or sintered after molded, part of a separately prepared a lead (wire or foil) may be molded together with the conductor and the other part of the lead outside of the molded body may be used as a lead of one electrode of the solid electrolytic capacitor device. Alternatively, after sintering the molded body, another lead may be connected to the lead of the molded body.

Also, by leaving a part of the conductor not having a semiconductor layer thereon, the part may be used as anode. On the boundary portion between the anode part and the other part having a semiconductor layer formed thereon, an insulative resin may be attached and cured in belt-like manner for the purpose of preventing the semiconductor layer from crawling up to the anode part. A dielectric layer may be present on part or whole of the lead or on part or whole of the anode part.

Preferred examples of conductor used in the present invention include tantalum powder, niobium powder, alloy powder containing tantalum as its main component, alloy powder containing niobium as its main component, niobium monoxide powder, niobium dioxide powder, a sintered body obtained by molding and sintering a mixture of at least two kinds selected from these powders and having inside a lot of fine pores and an aluminum foil having the surface subjected to etching treatment.

In advance to using the jig for producing capacitors according to the present invention (herein after, sometimes referred to simply as "the jig"), leads or anodes of multiple conductors are connected to separately prepared long plates, so that dielectric layers and then semiconductor layers respectively, may be formed on multiple conductors simultaneously.

At least one layer of the dielectric layer and the semiconductor layer of the capacitor produced by using the jig is formed by applying current with the lead or anode part of the conductor serving as anode and another metal plate placed in a solution for forming the dielectric layer or the semiconductor layer as cathode. In order to meet the conditions for applying current which are different from each other between formation of the dielectric layer and formation of the semiconductor layer and make the current applied to each of the conductors uniform, feeder circuits need to be separately provided as one circuit from each conductor to a feeding terminal provided on the long plate for formation of dielectric layer and as the other circuit from each conductor to a feeding terminal provided on the long plate for formation of semiconductor layer. Such a feeding terminal may be provided on a portion of the long plate which can be electrically connected to the edge-receiving portion described later. One example of such a structure is a long plate for producing capacitors which consists of a constant current circuit of discharge type connected to each of the conductors and to the feeding terminals, rectification circuit, and connecting function.

The jig of the present invention has a structure where such long plates can be installed. In order to simultaneously form dielectric layers on multiple conductors and then simultaneously form semiconductor layers thereon, a structure where a plurality of such long plates can be installed (for example, oriented in the same direction at regular intervals) is preferred.

The jig comprises two edge-receiving portions to receive both edges of each long plate in and the two edge-receiving portions are insulated from each other. The distance between the two edge-receiving portions is set to be a length for the two portions to be able to receive the plate edges. Also, in the two edge-receiving portions, at least the same number of incisions as that of the long plates are present in pairs, so that multiple long plates may be received by the portions. The width of the incision and the interval between the incisions are determined in consideration for the length of the long plates and the sizes of components and conductors mounted on the long plates.

As a mode where the two edge-receiving portions of the jig are electrically insulated from each other, in a case where at least one of the two edge-receiving portions consist of insulating material, electric wiring using for example, an electroconductive spring member is provided on the insulating material. In a case where both of the two edge-receiving portions consist of insulating materials, wiring may be installed such that a wire electrically conducting to the feeding terminal part of the long plate each of the edge-receiving portions receives is provided in each edge-receiving portion and the conducting wire leads to the feeding terminal for each edge-receiving portion. In this way, each feeding terminal for forming a dielectric layer and each feeding terminal for forming a semiconductor layer provided on the long plate are respectively connected to corresponding terminals in the two edge-receiving portions.

As described above, the long plate needs to have multiple constant current sources of discharge type connected to one feeding terminal and multiple diodes connected to the other feeding terminal, with a structure that current discharged from the constant current sources and cathodes of the diodes are connected to respective conductors. In this way, the jig, for example, becomes a jig having a structure that one feeding terminal of the long plate is connected to one edge-receiving portion and the other feeding terminal of the long plate is connected to the other edge-receiving portion. Further, the structure enables simultaneous formation of dielectric layers on multiple conductors connected to the long plate by passing current from the terminal of the other edge-receiving portion and simultaneous formation of semiconductor layers on the dielectric layers bypassing current from the terminal of one edge-receiving portion.

Each of the feeding terminals of the long plate are provided such that the terminals can conduct to the front and rear surfaces, and further, it is preferable that a metal fixture, for example, spring member be provided in each incision of the two edge-receiving portions so that the spring member can constitute a part of wiring, in that the spring member can prevent wobbling of the long plate inserted in each incision and at the same time serve as material conducting to the feeding terminal of the long plate. For example, at least one pair of springs, symmetric against the centerline of the incision, is provided in each of the incisions. Each of the springs is fixed at an appropriate position threadably or by the like means.

Metallic spring material can substitute all electric wirings provided in the edge-receiving portions of the jig. Moreover, by making all the metal plates uniform in shape, the number of types of molds needed for producing spring members can be decreased, which is advantageous on the cost front.

As material for spring member, a material having electroconductivity and strength is selected. Examples thereof include alloys of iron or copper (such as phosphor bronze). The surface of the material may be coated with various kinds of plating. The width of the spring member is determined in consideration for the size of the edge-receiving portion. The thickness of the spring member, which is determined in consideration for the size of the edge-receiving portion and the strength of the spring material, is generally within a range of 0.05 to 5 mm.

Two or more spring members may be placed in one incision. The more spring members are placed, the more stable the electric connection in the edge-receiving portion into which the plate is inserted can be.

It is preferred that the edge-receiving portions of the jig consist of insulating material so that the remaining portion of the jig may consist of metallic frame, which leads to increase in strength of the jig.

Examples of insulating material include insulating polymers such as fluorine resin and silicone resin and inorganic substances such as ceramics.

The size of the jig, the size of the edge-receiving portion and the size of the incision of the edge-receiving portion are determined according to the size and number of conductors and the size and number of the long plates. The jig frame may be equipped with handles for carrying the jig by hand or with legs for preventing the jig from contacting the surface of the place where the jig is left standing (to thereby avoid damage to conductors).

The two edge-receiving portions of the jig may consist of metal and electric insulation between the edge-receiving portions may be achieved by making the remaining portion consist of insulating material. Alternatively, the edge-receiving portions and the frame may consist of metal and the boundary area between the edge-receiving portions and the frame may consist of insulating material.

The edge-receiving portions may be connected to the feeding terminals of the long plate without using spring material in the incisions. Examples thereof include a jig where two edge-receiving portions each consisting of a comb-shape sheet standing on a surface of a plain pure-stainless steel plate are provided on two sides of the jig frame opposite to each other with insulating material provided there between. Gaps between the teeth of each comb-shape sheet serve as incisions to receive long plates in. Also, terminals for connection are provided at appropriate positions in the edge-receiving portions.

Figure 2:
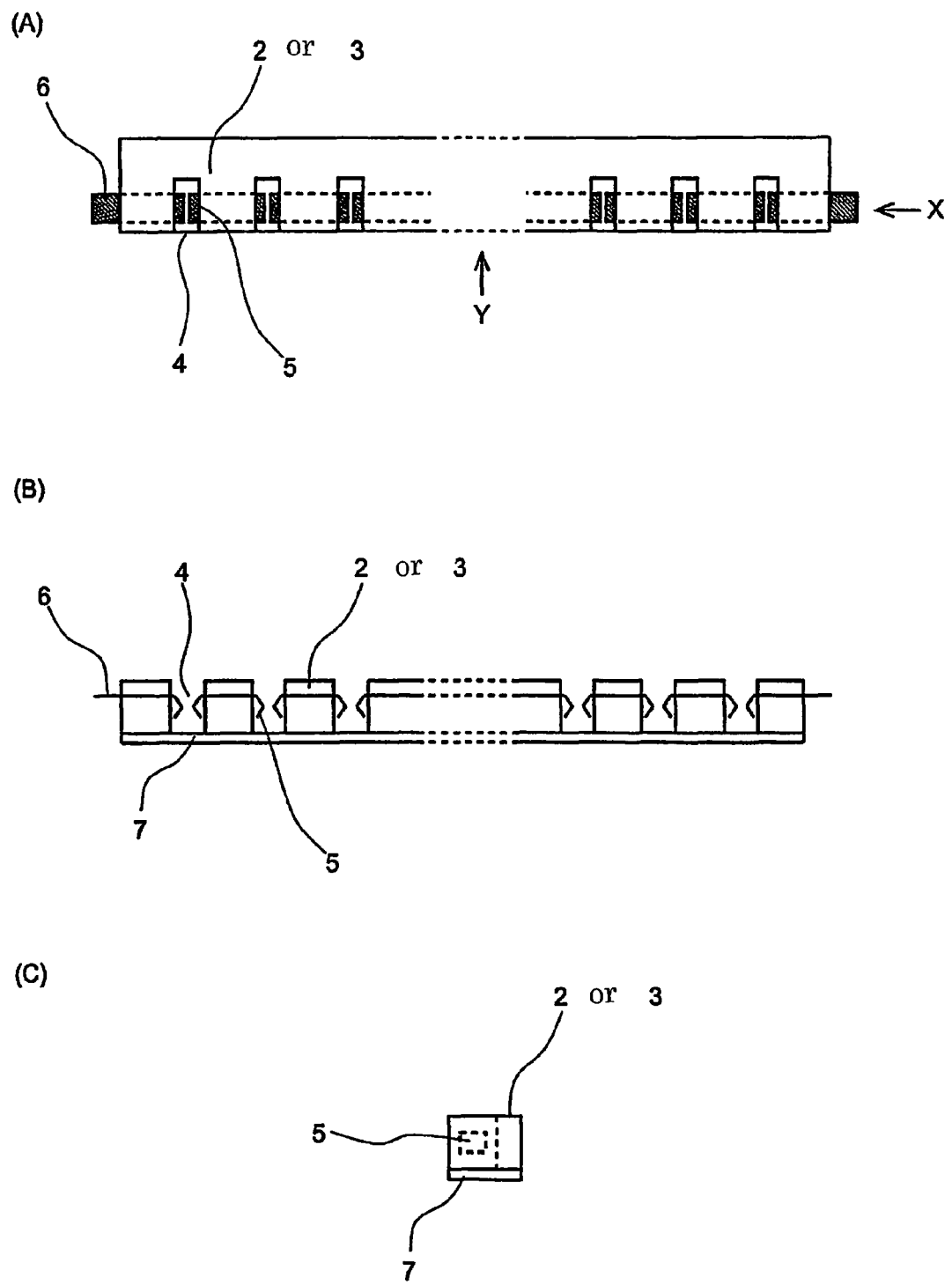
FIG. 2 (A) is a schematic view showing the edge-receiving portions of the jig of FIG. 1 (A) as seen from above, and FIGS. 2 (B) and 2 (C) are schematic views of the edge-receiving portion of FIG. 2 (A) as seen from X direction and Y direction, respectively.
Figure 3:
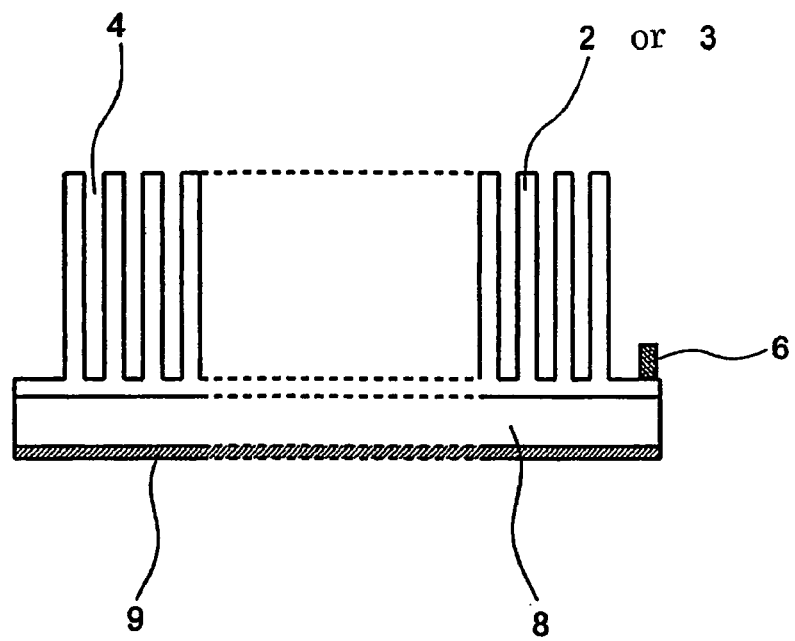
FIG. 3 (A) is a side view showing a structure of another embodiment of the edge-receiving portion of the jig according to the present invention, and FIG. 3 (B) is a view (plain view) of FIG. 3 (A) as seen from above.
Figure 3:
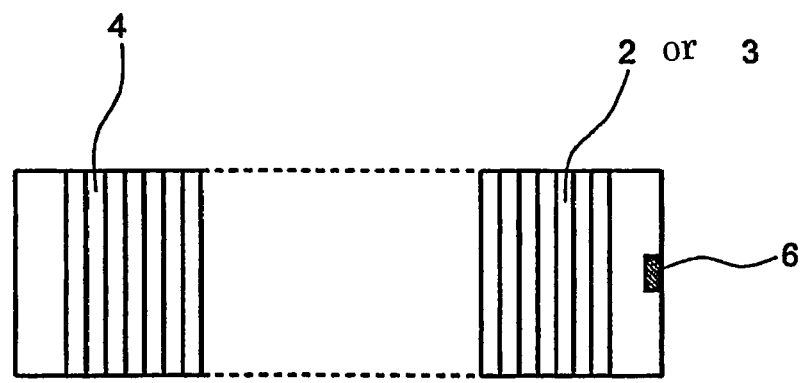

The jig and apparatus for producing capacitors of the present invention are explained in further detail based on the attached FIGS. 1 to 3.

FIG. 1(A) is a plan view showing a typical example of the jig of the present invention, and FIGS. 1(B) and (C) are side views of (A) when seen from X direction and Y direction, respectively. On edges of both sides of a square-shaped jig frame (1), edge-receiving portions (2, 3) are fixed, and each of the edge-receiving portions has multiple incisions (4). Into each of the incisions, a long plate connected to multiple conductors (not shown in FIG. 1) is inserted. The height of the edge-receiving portions (2, 3) is designed to be lower than that of the frame, so that conductors connected to the long plate inserted in the incisions (4) are not easily damaged when the jig are left standing.

FIG. 2(A) is a schematic view showing the edge-receiving portion of the jig of FIG. 1 (A) as seen from above, and FIGS. 2 (B) and 2 (C) are schematic views of the edge-receiving portions of FIG. 2 (A) when seen from X direction and Y direction, respectively. In each incision (4) of the edge-receiving portions (exaggeratingly enlarged in the Figures), a bent portion of spring member (5) is present, which stabilizes wide surface of the long plate inserted in the incision. In the end of each edge-receiving portion is provided an end of the spring member as terminal (6). The incision in each edge-receiving portion does not reach the bottom part of the edge-receiving portion. Also, a receiving under-plate (7) is fixed on the bottom surface of the edge-receiving portion. When a long plate having feeding terminals is inserted into each incision (4), current can be supplied to each conductor connected to the long plate by applying current from terminal (6).

FIG. 3(A) is a side view showing a structure of another embodiment of the edge-receiving portion of the jig according to the present invention, and FIG. 3 (B) is a view (plain view) of FIG. 3 (A) when seen from above.

The whole edge-receiving portion of the jig of this embodiment consists of metal and a terminal (6) is provided in the end of the edge-receiving portion. The width of each of the comb-like incisions (4) (though exaggeratingly enlarged in the Figures) is almost equal to the width of the long plate, so that the long plate can be secured by only inserting the long plate into the edge-receiving portions. Also, each incision has certain depth so that the long plate inserted therein settles at a certain point. The whole bottom surface is fixed on a metal receiving plate (8). Electric insulation between the two edge-receiving portions of this embodiment can be easily realized, for example, by providing an insulating member (9) on the rear surface of the receiving plate (8).

An apparatus using the jig of the present invention, which can laminate dielectric layers and then semiconductor layers on multiple conductors connected to a long plate, is explained below.

The long plate used in the present invention is, for example, an insulative body having circuit wiring provided by printing technology, with both ends of the long plate each having a feeding terminal electrically conducting to the front and rear surfaces. Connected to the lower end of the wide surface of the long plate are functions for connecting to conductors, which are electrically independent from each other and are capable of connecting to conductors, for example, a group of sockets into each of which one conductor or one conductor having a lead wire is inserted, all in the same direction. As for each socket, a constant current source of discharge type, for example, each cathode of a constant-current diode having circuit wiring is mounted on the wide surface of the long plate, while the anode of each constant-current diode is connected to feeding terminal present on one end of the long plate through circuit wiring. Further, each socket is connected through circuit wiring to each cathode of rectifier diode connected electrically in parallel with a constant current source, with the anode of each rectifier diode being connected to a feeding terminal present on the other end of the long plate through circuit wiring.

The jig into which multiple long plates each connected to conductors as described above are inserted is placed on a container separately prepared for forming dielectric layer, so that conductors and lead wires or a part of the anode part can be immersed in the container filled with chemical formation liquid. Then by applying current at a constant voltage with a terminal of edge-receiving portion leading to a rectifier diode as anode and a cathode plate placed in the chemical formation liquid as cathode, dielectric layer is formed on the surface of each conductor and lead wire and part of the anode part.

Next, after the jig is taken off from the container for forming dielectric layer and the conductors are washed and dried, the jig is placed on another container prepared for forming semiconductor layer, so that the conductors can be immersed in the container filled with liquid for forming semiconductor layer. Then by applying current at a constant voltage with a terminal of edge-receiving portion leading to a constant current diode as anode and a cathode plate placed in the liquid for forming semiconductor layer as cathode, semiconductor layer is laminated on the dielectric layer.

The liquid for forming semiconductor layer used here is a solution mainly consisting of water and/or organic solvent at least partially containing material which becomes a semiconductor when current is applied (such as monomer or oligomer which becomes a polymer and metal salt which becomes a metal oxide when current is applied) and in some cases containing dopant and oxidizing agent dissolved therein.

As the cathode plate to be placed in the chemical formation liquid and the liquid for forming semiconductor layer, which is used as anticathode when current is applied, electroconductive material, mostly, a metal foil or plate is used and the surface of the plate may be plated with silver or gold. In a case where dielectric layer and then semiconductor layer are formed on multiple conductors at a time, it is preferable that by using multiple cathode plates electrically connected to at least one power feeding member, electricity be uniformly distributed to all the multiple conductors immersed in the chemical formation liquid or in the liquid for forming semiconductor layer. The temperature, the pH value, time, the current value and voltage level of the applied current and the like at the time of forming semiconductor layer are determined in consideration for the type, mass and size of the conductor, the desired thickness of the semiconductor layer to be formed, the capacitance and operating voltage of the capacitor to be produced and the like. Applying current may be carried out twice or more times with different conditions for applying current. Generally, since conditions for applying current in forming dielectric layer are different from those in forming semiconductor layer, each of those layers cannot be formed when a conventional jig with the two edge-receiving portions being not insulated from each other. However, when the jig of the present invention, having the two edge-receiving portions insulated from each other, is used, current meeting each of the conditions can be supplied from each of the edge-receiving portions, so that the dielectric layer and semiconductor layer can be formed without problems.

Examples of dielectric layer formed on the surface of conductors and lead wires or a part of anode part include a dielectric layer mainly consisting of metal oxide containing at least one metal oxide selected from the group consisting of $Ta_2O_5$, $Al_2O_3$, $TiO_2$ and $Nb_2O_5$. For the chemical formation liquid, electrolytic solution containing organic acid or organic acid salt such as acetic acid, adipic acid, benzoic acid and oxalic acid or inorganic acid or inorganic acid salt such as phosphoric acid, sulfuric acid, boric acid and silicic acid is used. The temperature, time and current density at the time of chemical formation are determined in consideration for the type, mass and size of conductor, the capacitance and operating voltage of the capacitor to be produced and the like.

Examples of semiconductor laminated on the dielectric layer include semiconductor layer comprising at least one layer of organic semiconductor or inorganic semiconductor. At least one layer is formed by a method involving applying of current. Specific examples of organic semiconductors include one consisting of benzopyrroline tetramer and chloranil, one comprising tetrathiotetracene as its main component, one comprising tetracyanoquinodimethane as its main component, and one comprising as its main component electroconductive polymer obtained by allowing a polymer containing a repeating unit represented by formula (1) or (2) below to be doped with dopant.

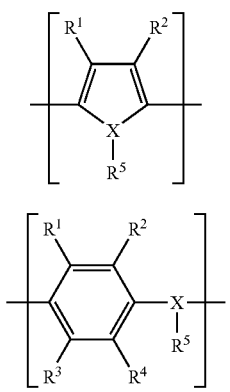

In formulae (1) and (2), $R^1$ to $R^4$ each independently represents a hydrogen atom, an alkyl group having 1 to 6 carbon atoms or an alkoxy group having 1 to 6 carbon atoms, X represents an oxygen atom, a sulfur atom or a nitrogen atom, $R^5$ is present only when X is a nitrogen atom and $R^5$ represents a hydrogen atom or an alkyl group having 1 to 6 carbon atoms, and each combination of $R^1$ and $R^2$ and of $R^3$ and $R^4$ may be bonded with each other to form a ring.

Further, preferred examples of polymer containing a repeating unit represented by formula (I) include a polymer containing a structural unit as a repeating unit represented by formula (3) below.

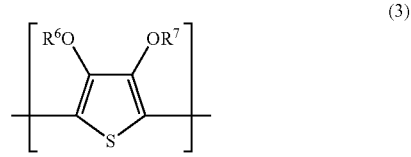

In the formula, $R^6$ and $R^7$ each independently represents a hydrogen atom, a linear or branched, saturated or unsaturated alkyl group having 1 to 6 carbon atoms or a substituent forming a cyclic structure of 5-, 6- or 7-membered saturated hydrocarbon where the alkyl groups are bonded with each other at an arbitrary site. Also, examples of the cyclic structure include those having a vinylene structure which may be substituted and those having a phenylene structure which may be substituted.

Electroconductive polymer having such a chemical structure is charged and doped with dopant. There is no particular limitation on the dopant and any known dopant may be used.

Representative preferred examples of dopant include a compound having a sulfonic acid group and a boron compound having a boron atom coordinated with carboxylic acid. Examples of such a compound include sulfonic acids having an aryl group such as benzene sulfonic acid, toluene sulfonic acid, naphthalene sulfonic acid, anthracene sulfonic acid, benzoquinone sulfonic acid, naphthoquinone sulfonic acid and anthraquinone sulfonic acid, sulfonic acids having an alkyl group such as butyl sulfonic acid, hexyl sulfonic acid and cyclohexyl sulfonic acid, various oligomers of polyvinyl sulfonic acid and the like. Polymer (polymerization degree 2 to 200) sulfonic acid, salts of these sulfonic acids (ammonium salt, alkali metal salt, alkali earth metal salt and the like). These compounds may have various substituents and have two or more sulfonic acid groups. Examples of such a compound include 2,6-naphthalene disulfonic acid and 1,2-ethane disulfonic acid. Further, examples of boron compound include ammonium borodisalicylate, hydrate thereof, and boro-1,2-carboxybenzene ammonium salt. As for dopant, two or more kinds of dopants may be used. The dopant used in the present invention is referred to as a compound, however, when the compound actually acts as dopant, it is in a partially charged state, i.e. in an ionized state (mainly anion). Therefore, examples of dopant include these dopants (for example, benzene sulfonic acid anion is included in case of benzene sulfonic acid).

Examples of polymer having a repeating unit represented by formula (1), (2) or (3) include polyaniline, polyoxyphenylene, polyphenylene sulfide, polythiophene, polyfuran, polypyrrole, polymethylpyrrole, and substituted derivatives and copolymers thereof. Preferred among these are polypyrrole, polythiophene and substituted derivatives thereof (for example, poly(3,4-ethylene dioxythiophene)).

The semiconductor layer is formed through pure chemical reaction method (solution reaction, vapor phase reaction, solid-liquid reaction or combination of these reactions), by electrolytic polymerization method or by combination of these methods. Semiconductor layer formed by at least once using electrolytic polymerization method is preferred in that the initial ESR value of the obtained capacitor is low as compared with those obtained in other methods, due to the small number of branches in electroconductive polymer chain or due to the uniform thickness of the semiconductor layer laminated on the surface of the conductor.

In electrolytic polymerization, the solution containing monomer or dopant as described above may be stirred. However, it is preferred that the solution stand still if possible, in order to prevent the solution from attaching to undesirable portions of the lead wire or the anode part if the solution surface is agitated.

Specific examples of inorganic semiconductor include at least one compound selected from the group consisting of molybdenum dioxide, tungsten dioxide, lead dioxide and manganese dioxide.

It is preferred that a semiconductor having electroconductivity of $10^{-2}$ to $10^3$ S/cm be used as the organic semiconductor or the inorganic semiconductor, in that the ESR value of the obtained capacitor can be small.

In the present invention, for the purpose of mending minute defects generated in the dielectric layer when semiconductor layer is formed thereon after applying current, chemical formation may be carried out again. Alternatively, applying of current and chemical reformation may be repeated twice or more times, and the conditions for applying current when repeating the steps may be changed. Generally, when applying of current is stopped, the conductors are pulled up from the liquid for forming semiconductor layer and subjected to washing and drying, however, the process of applying and stopping of current, washing and drying may be repeated twice or more times and then the conductors may be subjected to chemical reformation. Although the reason is unclear, the mass of the obtained semiconductor layer will be increased by repeating the process of applying and stopping of current, washing and drying than by continuously applying current if the total time period of applying current is the same, in some cases.

Chemical reformation can be carried out in the same manner as in the chemical formation for forming dielectric layer. The voltage at the time of chemical reformation is the voltage of chemical formation or less. Further, after mending minute electric defects generated in the surface of the dielectric layer on the conductors, semiconductor layer may be formed according to the method of the present invention.

In the capacitor of the present invention, for the purpose of improving electric connection with a lead wire outside the capacitor body (such as lead jig), an electrode layer may be provided on the semiconductor layer formed by the above described method. Such an electrode layer can be formed, for example, through solidification of electroconductive paste, plating, metal deposition, attachment of heat-resistant electroconductive resin film or the like. Preferred examples of electroconductive paste include silver paste, copper paste, aluminum paste, carbon paste, and nickel paste. One of these may be used independently or two or more of them may be used in combination. In a case where two or more kinds are used, they may be mixed with each other or each of them may be laminated as separate layers.

After applying the electroconductive paste, the layer is solidified by being left standing in the air or by heating.

The thickness of the electroconductive paste after solidification is within a range of about 0.1 to about 200 μm.

The electroconductive paste mainly consists of electroconductive powder such as resin and metal. In some cases, it may contain solvent to dissolve the resin or curing agent for resin. The solvent evaporates during the solidification process.

Examples of resin used in the electroconductive paste include various known resins such as alkyd resin, acrylic resin, epoxy resin, phenol resin, imide resin, fluorine resin, ester resin, imidamide resin, amide resin, styrene resin and urethane resin. As electroconductive powder used in the paste, at least one kind selected from the group consisting of silver, copper, aluminum, gold, carbon, nickel and alloy powder mainly containing these metals, coating powder having these metals on the surface, and mixtures of these metals is used.

The paste generally contains 40 to 97 mass % of electroconductive powder. If the concentration is less than 40 mass %, the prepared electroconductive paste has low electroconductivity. If the concentration exceeds 97 mass %, adhesion of the electroconductive paste becomes worse, which is not preferred. In the electroconductive paste, the above described electroconductive polymers or metal oxides used for forming semiconductor layer may be blended.

Examples of plating include nickel plating, copper plating, silver plating, gold plating and aluminum plating. Further, examples of metal used for metal deposition include aluminum, nickel, copper, gold and silver.

Specifically, for example, on the conductor having semiconductor layer thereon, carbon paste and silver paste are laminated sequentially, and then the conductor is sealed with a material such as epoxy resin, to thereby constitute a capacitor. The capacitor may have a lead wire of metal wire or metal foil, connected to the conductor in advance or after the production of the capacitor.

The capacitor having the above structure of the present invention can be jacketed for example, with resin-molding, resin casing, metal casing, resin dipping or laminate film, to obtain the capacitor product. Among these, chip-type capacitors jacketed by molding with resin are preferred from the view point of downsizing and reducing costs.

Jacketing by molding with resin is described in detail. The capacitor of the present invention is placed on a separately prepared lead frame having a pair of tips facing with each other such that a part of the electrode layer of the capacitor element is placed on one of the tips and the lead wire or a part of the anode part of the capacitor is placed on the other tip of the lead frame. On this occasion, the end of the lead wire or the anode part may be cut so that the size can fit for the tip of the lead frame. Next, the former is subjected to juncture treatment, for example through solidification of the electroconductive paste and the latter is subjected to juncture treatment through welding, electrically or mechanically, respectively, and then the capacitor element is sealed with resin with leaving some part of the tips unsealed. The lead frame is subjected to cutting and bending process at predetermined portions outside the resin jacket, to thereby obtain the final product. In a case where the lead frame is present on the undersurface of the resin jacket and the sealing has been provided on parts except for the undersurface only or the undersurface and the side surfaces of the lead frame, the lead frame may be subjected to cutting process only.

The lead frame finally becomes an external terminal of a capacitor after subjected to cutting process. The shape is like a foil or a sheet, and as its material, iron, copper, aluminum, or an alloy mainly containing these metals is used. Whole or part of the lead frame may be plated with solder, tin, titanium, gold, nickel and the like. Further, between the lead frame itself and the plating, a base plating such as nickel plating and copper plating may be present. The thickness of the plating is generally within a range of about 0.01 to 30 μm per layer.

Such plating treatments of the lead frame may be carried out before or after the cutting and bending process. Alternatively, plating treatments may be carried out before the capacitor element is placed and attached onto the lead frame and then plating treatment may be carried out again after sealing the capacitor at an arbitrary timing.

The lead frame has a pair of tips disposed to face with each other and because of the distance between the tips, anode and cathode of each capacitor can be insulated with each other.

Examples of resin used in jacket molding include known resins used for sealing solid electrolytic capacitors, such as epoxy resin, phenol resin and alkyd resin. It is preferred that a low-stress type of these resins be used in that sealing stress on the capacitor element at the time of the sealing step can be alleviated. Further, as a production machine for sealing with resin, a transfer machine is preferably used.

For the purpose of mending parts of the dielectric layer deteriorated electrically and/or physically at the time of forming the electrode layer or at the time of jacket molding, the thus obtained capacitor may be subjected to aging treatment. Aging treatment is carried out by applying a predetermined voltage (generally twice the rated voltage or lower) to the capacitor. Since the optimal time period and temperature for aging treatment differ depending on the type, capacitance and rated voltage of the capacitor, those are determined after carrying out experiments. Generally, the time period is within a range from several minutes to several days, and the temperature is 300° C. or less in consideration for heat deterioration of the voltage-applying jig. The atmosphere for aging treatment may be any of reduced pressure, normal pressure and increased pressure. Moreover, aging treatment may be carried out in the air or in the atmosphere of gas such as Ar, $N_2$ and He, preferably in water vapor. If aging treatment is carried out in the atmosphere containing water vapor and then in gas such as air, Ar, $N_2$ and He, stabilization of dielectric layer proceeds in some cases. Aging treatment may be carried out by supplying water vapor and then restoring normal pressure and room temperature or by supplying water vapor and then leaving the capacitor standing at a high temperature of 150 to 250° C. for several minutes to several hours to thereby remove excessive water. Examples of method supplying water vapor include a method of supplying water vapor from a water holder placed in the aging furnace by using heat.

A method for applying voltage may be designed such that an arbitrary current such as direct current, alternate current having an arbitrary waveform, AC superposed on DC and pulse current may be applied. During the aging treatment, applying of voltage may be stopped and restarted. The aging treatment may be carried out by gradually increasing the voltage from the rated voltage to a higher voltage.

Capacitors produced according to the present invention semiconductor layer are stable in capacitance, since semiconductor layers can be formed under the same stable conditions and the thus formed semiconductor layers are uniform in quality. Therefore, the group of capacitors (multiple capacitors produced in one production process) has a narrow variety in capacitance as compared with conventional capacitors. Thus, production yield in a case where production of capacitors having capacitance of a specific range is desired can be enhanced.

Also, the group of capacitors produced according to the present invention can be used in digital devices such as personal computers, servers, cameras, game consoles, DVD, audio/video devices and cellular phones and electronic devices such as those for electric sources.

BEST MODE FOR CARRYING OUT THE INVENTION

The present invention is described in greater detail by referring to Examples, however, the present invention is not limited to these Examples.

Example 1

1. Production of Jig for Producing Capacitors

In FIG. 2 (A), an edge-receiving plate made of fluorine resin (having a length of 100 mm, a width of 13 mm and a thickness of 26 mm and having a 1.5 mm-thick stainless-steel backing plate bonded to the rear surface) with 10 incisions at intervals of 6 mm between the incisions was prepared. Then, a white metal spring material (a width of 2.7 mm, a thickness of 0.2 mm) bended as in FIG. 2 (B) was placed in each of the incisions. In this structure, the spring material can be a wiring provided at the edge-receiving portion and also be two terminals protruded from both ends of the edge-receiving portion.

Meanwhile, a stainless-steel frame having a length of 206 mm and an width of 100 mm in outer size and a length of 196 mm and a width of 84 mm in inner size in FIG. 1, and having a thickness of 5 mm and 46 mm-high legs at corners in FIG. 1 (C) to form side surface having a one-side open rectangular shape, was used. Moreover, two edge-receiving portions were arranged parallel to the width direction of the frame such that the incisions of one edge-receiving portion faced toward those of the other edge-receiving portion, to thereby produce a jig for producing capacitors. The edge-receiving portions were insulated electrically from each other.

2. Production of Capacitor

A tantalum sintered body (having a size of 4.5×1.5×1.0 mm a mass of 42 mg and a 0.40 mmφ outgoing lead wire made of tantalum, with a 10-mm end of the wire protruding from the surface) with CV of 140,000 μF·V/g was used as the conductor. In order to prevent the solution from splashing up at the later step for forming semiconductor layer, a tetra fluoroethylene-made washer was attached to the lead wire.

Meanwhile, on a separately prepared glass epoxy plate having a length of 194 mm, a width of 33 mm and a thickness of 1.2 mm, a circuit connecting each connection terminal having a socket structure for conductors with constant current diode and leading to a feeding terminal for forming semiconductor layer (having a length of 8 mm, a width of 33 mm, placed at one short side of the glass epoxy plate on both front and rear surfaces, the terminals on both front and rear surfaces being electrically connected via a through hole) and a circuit connecting each of the above-mentioned connection terminals having a socket structure with rectifier diode and leading to a feeding terminal for electrochemical formation via a through hole (having a length of 8 mm, a width of 33 mm, placed at the other short side of the glass epoxy plate on both front and rear surfaces, the terminals on both front and rear surfaces being electrically connected via a through hole) were formed by printed wiring. As connection terminal for the conductor, a connection terminal having a round-pin socket structure with 64 pins (having a design with gold plating at both sleeve and contact sites) at pitches of 2.54 mm (PCD Receptacle 399 Series, manufactured by Tokiwa & Co., Inc.) was used and 64 through-holes corresponding to the socket pins were provided in the glass epoxy plate, so that the socket pins were inserted into the through-holes and connected by soldering. As the constant current diode, those having 115 to 155 μA were selected from E-101 product series manufactured by Ishizuka Electronics Corporation and as the rectifier diode, EP05DA40 manufactured by Nihon Inter Electronics Corporation was used. Through-holes corresponding to respective diodes were provided and the diodes were connected thereto by soldering. The lead wire of Ta sintered body was inserted into respective connection terminals of thus prepared 10 long plates so that a 4.5×1.0 mm surface of the tantalum sintered body was parallel with a longitudinal direction of the long plate. Further, each long plate was inserted into the spring member portion of the edge-receiving portion of the jig for producing capacitors. A total of 640 sintered bodies were arranged in one direction in the jig for producing capacitors. Thus, a circuit reaching the constant current diode of the long plate was connected to one edge-receiving portion, and a circuit reaching the rectifier diode of the long plate was connected to the other edge-receiving portion.

The jig for producing capacitors was placed on a separately prepared tank containing 0.1 mass % aqueous phosphoric acid solution for forming dielectric layer (liquid for electrochemical formation) such that the conductors and a part of the outgoing lead could be dipped in the solution. Then, electrochemical formation was carried out at voltage of 9V applied to the conductors, by using the terminal of the edge-receiving portion reaching the constant current diode as anode and a tantalum plate placed in the electrochemical formation solution tank as cathode at 60° C. for 8 hours, to thereby form dielectric layer comprising $Ta_2O_5$ on the conductors and to a portion of the outgoing lead wires. The jig was removed from the tank for forming dielectric layer, and the conductors were washed with water and dried at 100° C. Subsequently, the jig was placed on a tank containing an ethylalcohol solution of 5 mass % iron naphthalene sulfonate, then the operation of immersing only the conductors, pulling up the frame and drying the same at 50° C. was repeated 2 times.

Furthermore, the jig was placed on a separately prepared tank for forming semiconductor layer which was filled with an aqueous solution of 20 mass % ethylene glycol dissolving 3,4-ethylenedioxythiophene of a saturated concentration or higher and 3 mass % anthraquinone-2-sulfonic acid such that the electric conductors could be immersed in the aqueous solution. By using as anode the terminal of the edge-receiving portion reaching the constant current diode and using as cathode a tantalum plate disposed in the solution for forming semiconductor layer, current was applied at a voltage of 11 V and a constant current of 90 mA for 60 minutes to form a semiconductor layer on the dielectric layer of each conductor. The jig was then pulled up, washed with water and further with alcohol, and dried at 80° C. Further, the jig was placed on the tank previously used for forming dielectric layer such that the conductors and the portion of the lead were immersed in the chemical formation solution. Electrochemical reformation was performed by applying a voltage of 6 V to the conductors at 60° C. for 15 minutes from the terminal of the edge-receiving portion in the right side. The jig was then pulled up, washed with water and further with alcohol, and dried at 80° C. After carrying out 7 times the operations of forming semiconductor layer and performing electrochemical reformation, the jig was disposed on a tank filled with carbon paste to immerse the conductors, pulled up and dried sequentially at 80° C. and 100° C. Further, the jig was disposed on a tank filled with silver paste to immerse the conductors, pulled up and dried sequentially at 80° C., 100° C. and then 125° C., whereby an electrode layer was stacked on the semiconductor layer.

Each of the conductors after the formation of the electrode layer was removed from the jig for producing capacitors. On anode side of two end parts of a separately prepared lead frame having a tin-plated surface, the lead wires of two electric conductors, with a part of each of the lead wires cut off, were placed and the 4.5×1.0 mm silver paste side of the two electric conductors were laid in the cathode side in parallel without intervals. The former was connected by spot welding and the latter was connected through solidification of silver paste. Thereafter, the entirety excluding a portion of the lead frame used as terminal for capacitors was molded with epoxy resin to produce 320 chip capacitors having a size of 7.3×4.3×2.8 mm. The capacitors were left standing in a constant humidity tank at 60° C. and 90% RH for 24 hours, then dried at 185° C. for 15 minutes and subjected to aging at 125° C. while applying a voltage of 3 V to the conductors for 3 hours. The capacitors produced had a capacitance of 1000 μF at a rated voltage of 2.5 V and a variation in capacitance of 298 capacitors in the range of 950 to 1,050 μF, 12 capacitors in the range of 1,050 to 1,100 μF, and 10 capacitors in the range of 900 to 950 μF. The average value of ESR (equivalent series resistance) was 8 mΩ.

Comparative Example 1

A jig made of stainless-steel including edge-receiving portions was used. The intervals of the incisions in the jig were 1.1 mm. To a stainless-steel plate used as a long plate having a thickness of 1 mm, conductors were connected at pitches of 2.5 mm by spot welding. Excepting these, 10 long plates were inserted into the incisions of edge-receiving portions of the jig in the same manner as in Example 1. Subsequently, a dielectric layer was formed in the same manner as in Example 1. Then, a semiconductor layer was formed by repeating 60 times a series of the operation of placing a frame on a separately prepared tank filled with an alcohol solution dissolving 1 mass % 3,4-ethylenedioxythiophene, immersing the conductors therein, pulling up and drying at 50° C. for 20 minutes, and the operation of placing the frame on a separately prepared tank filled with an aqueous solution dissolving 3 mass % anthraquinone sulfonic acid and 1 mass % ammonium persulfate, immersing the conductors, pulling up and drying at 100° C. for 30 minutes. Electrochemical formation was performed at 60° C. with a voltage of 6 V for 15 minutes every 5 times of the series of the operations. Thereafter, formation of an electrode layer and molding were performed in the same manner as in Example 1 to produce 320 capacitors. The capacitor obtained had a capacitance of 1000 μF at a rated voltage of 2.5 V and a variation in capacitance of 214 capacitors in the range of 950 to 1,050 μF, 3 capacitors in the range of 1,050 to 1,100 μF, 68 capacitors in the range of 900 to 950 μF and 35 capacitors in the range of 850 to 900 μF. The average value of ESR (equivalent series resistance) was 17 mΩ.

Example 2

1. Production of Jig for Producing Capacitors

Two all stainless-steel edge-receiving portions comprising a structure where on a surface of a plate having a length of 100 mm, a width of 13 mm and a thickness of 2 mm, eleven rectangular solids each having a length of 6 mm, a width of 8 mm and a height of 20 mm were arranged in the region from the point 10 mm from the edge of the surface in the longitudinal direction at 1.3 mm intervals (the ends of the rectangular solids are aligned with the end of the plate. Stainless-steel terminal was connected at the longitudinal end of the plate. On the side surfaces facing of the thus provided eleven rectangular solids, a stainless-steel side-receiving plate having a length of 79 mm, a width of 20 mm and a thickness of 1.2 mm was provided, which was to be used in positioning a long plate when the long plate described below was inserted into the incision.

On the other hand, on two sides of a frame made of fluorine resin having a length of 206 mm and a width of 100 mm in outer size and a length of 196 mm and a width of 90 mm in inner size a thickness of 5 mm, which frame has two legs having a length of 46 mm at both ends, two edge-receiving portions were placed, to thereby prepare a jig for producing capacitors with the edge-receiving portions being electrically insulated from each other.

2. Preparation of a Capacitor

A niobium sintered body with CV of 290,000 μF·V/g was used as the electric conductor. (The sintered body had a size of 4.5×1.5×1.0 mm, a mass of 24 mg and an outgoing niobium lead wire of 0.40 mmφ with a 10-mm end of the wire protruding from the surface. The niobium sintered body was sintered by pulverizing niobium ingot with hydrogen brittleness and molding thus obtained niobium powder with average particle size of 0.3 μm. The niobium powder was partly nitrided to contain 9,000 mass ppm of nitrogen atoms and the surface of the powder was naturally oxidized to contain 11,000 mass ppm of oxygen atoms.) In order to prevent the solution from splashing up at the later step of forming semiconductor layer, a tetra fluoroethylene-made washer was attached to the lead wire.

Connected to ten long plates whose lower ends of both ends had been cut by 8 mm×8 mm were 640 conductors, and these long plates were inserted into the incisions of the jig, in the same manner as in Example 1.

Next, dielectric layer comprising $Nb_2O_5$ was formed by applying a voltage of 20 V to the conductors in the same manner as in Example 1. Subsequently, the operation of placing the on the top of the tank containing ethyl alcohol solution of iron naphthalene sulfonate to dip the conductors only therein, pulling up the jig and drying at 50° C. was repeated 10 times.

Then, in the reaction room where the temperature was set at 7° C., semiconductor layer was formed through electrochemical reformation by using pyrrole and a voltage of 14 V instead of 3,4-ethylene dioxy thiophene and 6 V used in Example 1. Then, the electrode layer was formed in the same manner as in Example 1 to produce chip capacitors. The capacitors obtained had a capacitance of 470 μF at a rated voltage of 4 V and a variation in capacitance of 285 capacitors within a capacitance range of 445 to 495 μF, 19 capacitors within a capacitance range of 495 to 520 μF and 16 capacitors within a capacitance range of 420 to 445 μF. The average value of ESR was 10 mΩ.

Comparative Example 2

Conductors were connected by spot-welding at 2.5 mm intervals to each of the long plates in the same manner as in Example 2, except that the frame of the jig was made of stainless-steel (both of the edge-receiving portions were conducting to each other) and that the long plates used were made of stainless-steel each having a thickness of 1.2 mm. The 10 long plates were inserted into incisions of frames in the same manner as in Example 1. Subsequently, dielectric layer was formed in the same manner as in Example 2. Subsequently, the operation of placing the on the top of the tank containing naphthalene sulfonic acid iron ethyl alcohol to dip the conductors only therein, pulling up the jig and drying at 50° C. was repeated 10 times. Next, after the jig was disposed on the liquid for forming semiconductor layer as in Example 2, separately prepared ten stainless-steel plates (each end of the stainless-steel plates was connected to one external terminal), having a length of 170 mm, a width of 5 mm and a thickness of 2 mm, to each of which sixty-four 1-mmφ gold-plated copper wires were connected at intervals of 2.54 mm in the same direction, were placed above the jig, so that each end of the gold-plated copper wires was at about 1 mm apart from the surface of the corresponding conductor. By using as anode the external terminal and using as cathode a tantalum plate present in the liquid for forming semiconductor layer, a current was applied at 5 V for 60 minutes. The semiconductor layer is formed by repeating electrochemical reformation and applying of current (current was applied at a predetermined voltage so that the current applied per conductor was in a range of 115 to 155 μA) from an external terminal. Then, electrode layer was formed to produce chip capacitors.

The capacitors obtained had a capacitance of 800 μF at a rated voltage of 4V and a variation in capacitance of 203 capacitors in the range of 445 to 495 μF, 26 capacitors in the range of 495 to 520 μF, 51 capacitors in the range of 420 to 445 μF, 17 capacitors in the range of 400 to 420 μF and 23 capacitors in the range of 375 to 400 μF. The average value of ESR was 12 mΩ.

The capacitance variations of the groups of capacitors obtained in Examples 1 and 2 are found to be definitely narrower than those of Comparing Example 1 with Comparative Example 1, respectively.

INDUSTRIAL APPLICABILITY

The present invention provides a jig for producing capacitors, wherein both ends of the jig (edge-receiving portions) to receive and fix a long plate having thereon multiple conductors on each of which dielectric layer is formed at a time and then semiconductor layer is formed on the dielectric layer at a time are insulated from each other, and an apparatus for producing capacitors using the jig. According to the present invention, without taking the conductor off from the frame after forming the dielectric layer, uniform semiconductor layer can be formed and a group of capacitors having an excellent ESR value can be produced.

The invention claimed is:

1. A jig for producing capacitors comprising two mutually electrically insulated edge-receiving portions positioned to fix both edges of a frame with an interior space for each of a plurality of long plates, wherein the jig is configured for fixing the plurality of long plates for simultaneously forming dielectric layers on multiple conductors for solid electrolytic capacitors and simultaneously forming semiconductor layers on the dielectric layers thereon, and wherein said insulated edge receiving portions include slot shaped incisions with independent wiring in each of said incisions having at least one slot shaped incision connected to a power source to connect conductors through the electric circuit on the long plate.

2. The jig for producing capacitors claimed in claim 1, wherein the edge-receiving portion has an insulating body required for mutual electrical insulation.

3. The jig for producing capacitors claimed in claim 1, wherein the edge-receiving portion has said wiring to electrically connect to each of the conductors through an electric circuit on the long plate wherein said wiring extends into the slot to form a contact.

4. The jig for producing capacitors claimed in claim 1, wherein each of the incisions of the two edge-receiving portions has a fixture for fixing the received long plate.

5. The jig for producing capacitors claimed in claim 4, wherein the fixture is a spring which serves also as part of electric wiring to connect to each of the conductors through an electric circuit on the long plate.

6. An apparatus for producing solid electrolytic capacitors, comprising the jig for producing capacitors claimed in claim 1 and long plates for simultaneously forming dielectric layers on multiple conductors for solid electrolytic capacitors and simultaneously forming semiconductor layers on thus formed dielectric layers by using the jig, wherein each of the long plates has a feeding terminal for forming the dielectric layer and feeding terminals for forming the semiconductor layer and is equipped with a connection mechanism for connecting multiple conductors.

7. The apparatus for producing capacitors claimed in claim 6, having a structure where the feeding terminal of the long plate is connected to one edge-receiving portion and the other feeding terminal of the long plate is connected to the other edge-receiving portion.

8. A capacitor produced by using the apparatus for producing capacitors claimed in claim 6.

* * * * *